(12) United States Patent
Leblanc et al.

(10) Patent No.: US 8,943,122 B2
(45) Date of Patent: Jan. 27, 2015

(54) METHOD AND SYSTEM FOR AUTHORING MOBILE CONTENT IN WORD FOR DELIVERY TO A MOBILE DEVICE

(75) Inventors: Michael Leblanc, Fredericton (CA); Jody Glidden, Sterling, VA (US); Jacob Samuel O'Reilly, Fredericton (CA); David James Hudson, Fredericton (CA)

(73) Assignee: BlackBerry Limited, Waterloo, Ontario (CA)

( * ) Notice: Subject to any disclaimer, the term of this patent is extended or adjusted under 35 U.S.C. 154(b) by 188 days.

(21) Appl. No.: 12/435,205

(22) Filed: May 4, 2009

(65) Prior Publication Data

US 2010/0036908 A1 Feb. 11, 2010

Related U.S. Application Data

(60) Provisional application No. 61/086,181, filed on Aug. 5, 2008.

(51) Int. Cl.
 G06F 15/16 (2006.01)
 G06F 17/30 (2006.01)
 H04L 29/08 (2006.01)

(52) U.S. Cl.
 CPC .......... G06F 17/30905 (2013.01); H04L 67/04 (2013.01); H04L 67/02 (2013.01)
 USPC .......................................... 709/203; 709/246

(58) Field of Classification Search
 CPC .... G06F 17/30905; H04L 67/02; H04L 67/04
 USPC .................................................. 709/203, 246
 See application file for complete search history.

(56) References Cited

U.S. PATENT DOCUMENTS

| 2002/0138440 A1* | 9/2002 | Vaidyanathan et al. ........ 705/54 |
| 2003/0023755 A1 | 1/2003 | Harris et al. |
| 2003/0203732 A1 | 10/2003 | Eerola et al. |
| 2005/0240588 A1* | 10/2005 | Siegel et al. ...................... 707/9 |
| 2006/0015649 A1 | 1/2006 | Zutaut et al. |
| 2007/0160070 A1* | 7/2007 | Buchhop et al. .............. 370/401 |
| 2008/0039010 A1 | 2/2008 | Vance et al. |
| 2008/0108299 A1 | 5/2008 | Hullot et al. |

FOREIGN PATENT DOCUMENTS

WO 0231700 A1 4/2002

OTHER PUBLICATIONS

Canadian Intellectual Property Office, Office Action dated Jun. 10, 2013, issued in Canadian Patent Application No. 2,733,369.
Canadian Intellectual Property Office, Office Action dated Apr. 9, 2013, issued in Canadian Patent Application No. 2,733,369.

* cited by examiner

*Primary Examiner* — David X Yi
(74) *Attorney, Agent, or Firm* — Norton Rose Fulbright Canada LLP

(57) ABSTRACT

A system and method is provided for delivering content to a wireless device in a content delivery system. The system and method may: provide web services for publishing the content and exporting the content to a content server, the content being in a first format; convert the content from the first format to a second format compatible with the wireless device; and in response to a request for the content, deliver the content to the wireless device.

20 Claims, 7 Drawing Sheets

METHOD AND SYSTEM FOR AUTHORING MOBILE CONTENT IN WORD FOR DELIVERY TO A MOBILE DEVICE

CROSS REFERENCE TO RELATED APPLICATIONS

The present application claims priority to U.S. Provisional Application No. 61/086,181 Aug. 5, 2008, the entirety of which is hereby incorporated by reference.

TECHNICAL FIELD

The present disclosure relates generally to portable devices, and more particularly to a system and method for authoring or delivering mobile content for delivery to a mobile device.

BACKGROUND

Mobile content delivery systems for content creation applications, such as Microsoft® Word®, exist in the market today. Mobile content delivery is when content that is developed specifically for a mobile device is pushed or sent to a selected user's mobile device, such a wireless communication device. The content is developed, packaged, and then sent to a user in a format that allows playback on a mobile device.

One of the challenges with the current systems is that they do not provide automatic delivery to a user's mobile device. For example, in the case of a Word file, The Word content is typically packaged and delivered as an e-mail attachment or is retrieved through an HTML link on a web page. With these methods, the user must download the Word file as an e-mail attachment or download the Word file as a link on an HTML page. These methods also require end-user interaction and intervention for successful delivery. These methods typically do not allow for the tracking of when the Word content was accessed or if it was successfully delivered to the device. The current systems typically do not support audio and video that is embedded into the Word file.

Another challenge with the current systems, for example in the case of Word documents, is distribution security. If a document is created and sent to a user via email, then that user may send it to whomever they wish and there would be no control or record of where it is distributed.

It would be desirable to have a method and system that addresses at least some of these challenges.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

In some aspects, there is provided a content delivery system for delivering content to a wireless device, the system comprising: a content server configurable to deliver content to the wireless device, the content server having a processor connected to a memory; and a mobile connector coupled to the content server for delivering the content to the wireless device, the content server having one or more modules stored in the memory and being configured to cause the content server to: provide web services for publishing the content and exporting the content to the content server; receive exported content, the content being in a first format; convert the content from the first format to a second format compatible with the wireless device; and in response to a request for the content, deliver the content to the wireless device.

In some aspects, there is provided a computer program product for authoring content for a wireless device in a content delivery system, the computer program product having computer executable instructions tangibly recorded thereon, the computer program product being configured to instruct a computer to: provide selectable content delivery options for controlling the delivery of the content; provide selectable content publishing options for controlling the publishing of the content; and in response to an instruction to publish content, publish and export the content using web services provided by the content delivery system, in accordance with at least one of a selected content delivery option and a selected content publishing option.

In some aspects, there is provided a method for delivering content to a wireless device in a content delivery system having a content server configurable for delivering content to the wireless device, the method comprising: providing web services for publishing the content and exporting the content to the content server; receiving exported content at the content server, the content being in a first format; converting the content from the first format to a second format compatible with the wireless device; and in response to a request for the content, delivering the content to the wireless device.

In the system, computer program product and method described above, there may be provided one or more selected publishing or delivery options for the content, and publishing, formatting and/or delivering the content is in accordance with the one or more selected publishing or delivery options.

Figure 1:
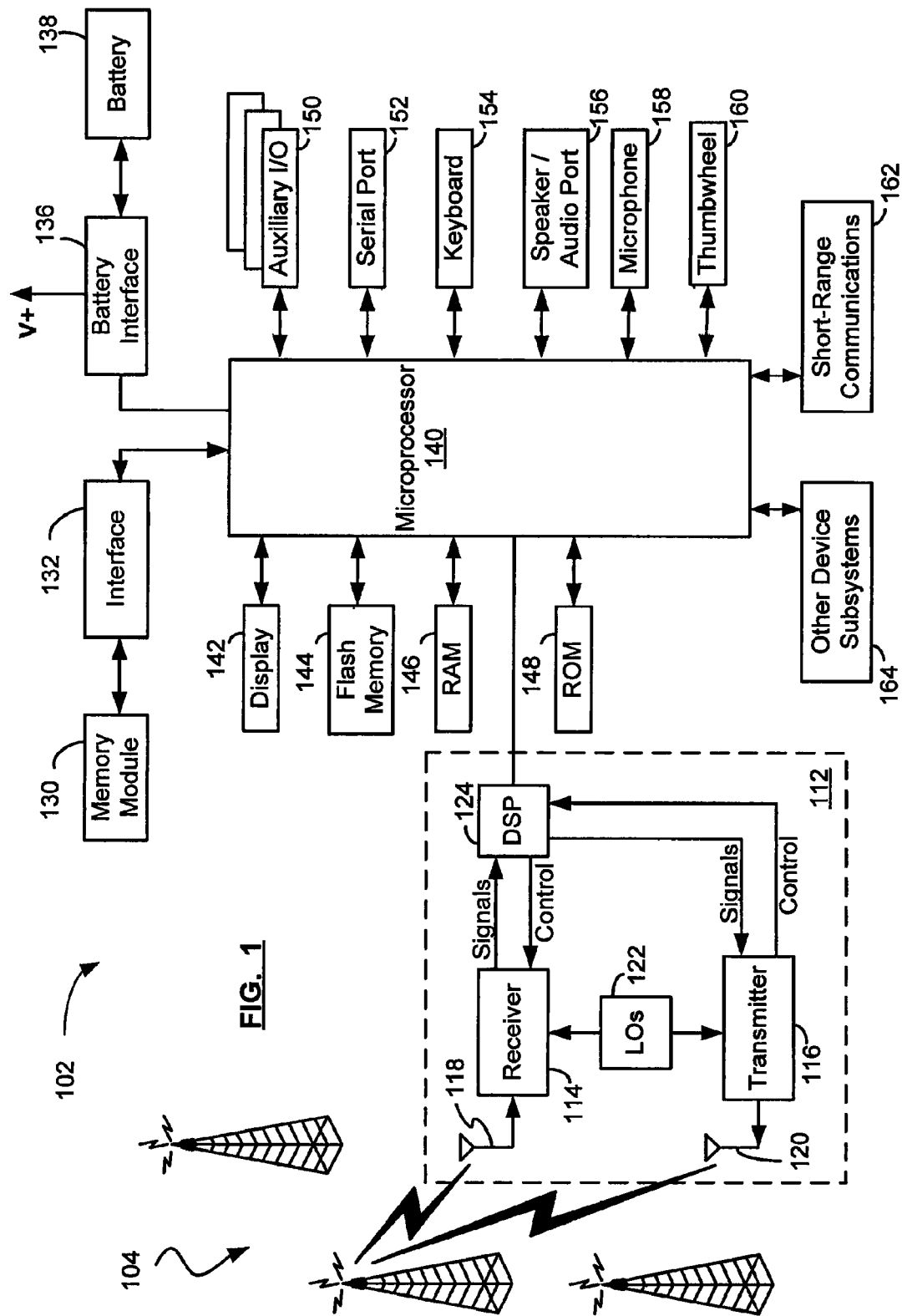
FIG. 1 shows in block diagram form a wireless device suitable for having a mobile content application in accordance with one embodiment.

Reference is first made to FIG. 1, which shows a block diagram illustrating a portable wireless device 102 that is suitable for having a mobile content application in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, trackball, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel or trackball 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel or trackball 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
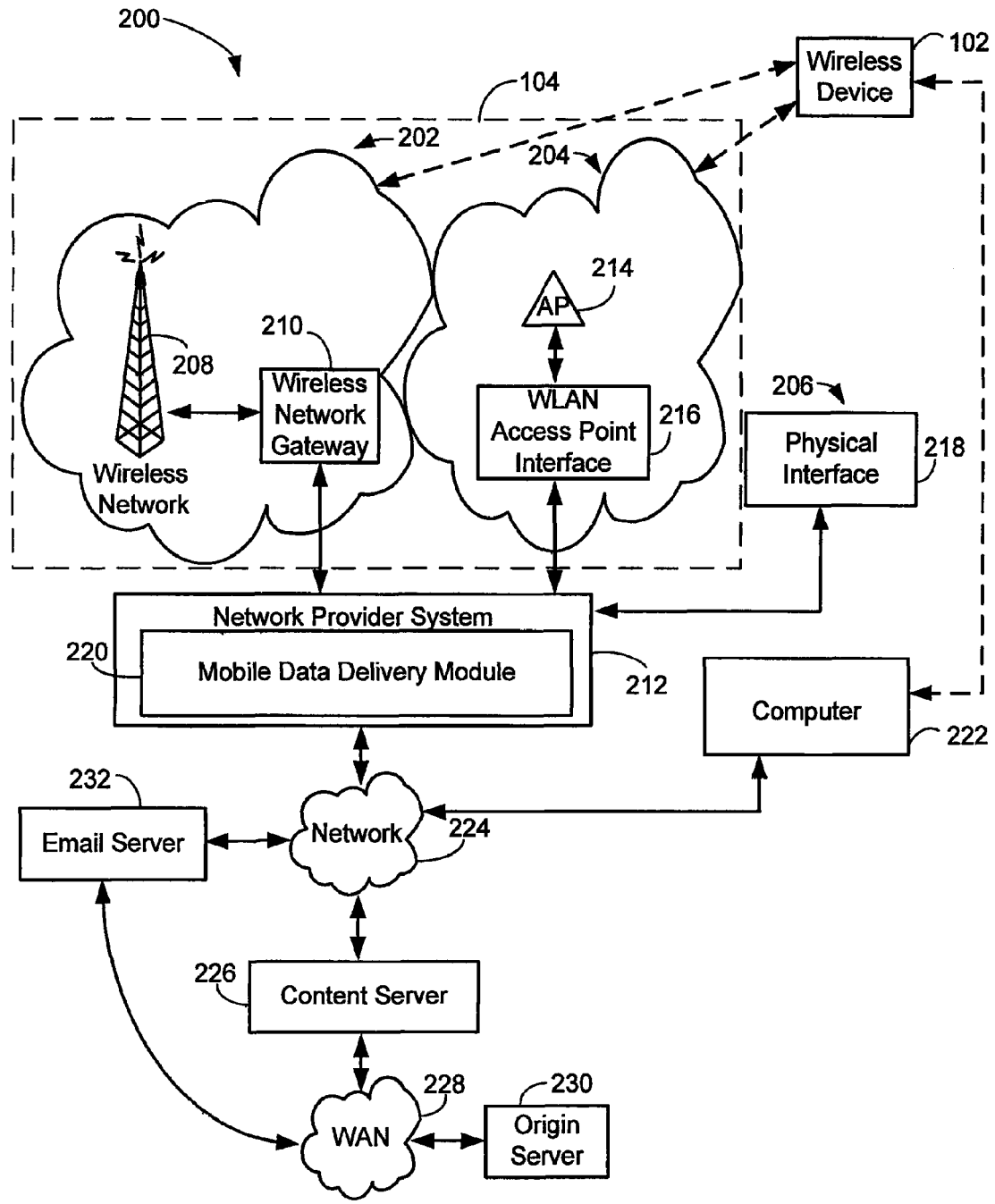
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), Evolution-Data Optimized (EV-DO), or 4G.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
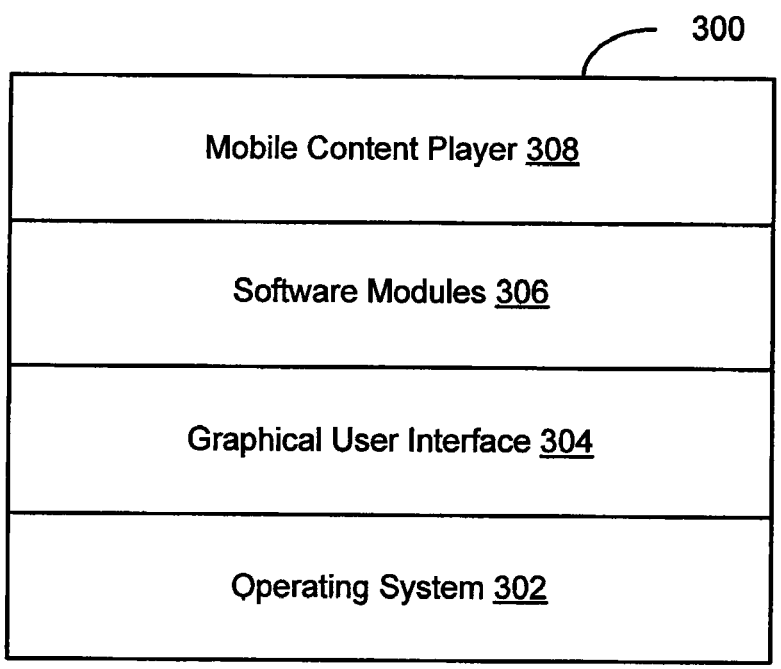
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel or track ball 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a mobile content application 308, which may also be referred to as a content delivery module. In one example, the mobile content application 308 may be integrated into the operating system 302. Alternatively, the module 308 may be a separate software component, as illustrated in FIG. 3. The mobile content application 308 may be responsible for managing push content delivery from multiple servers from the perspective of the wireless device 102 and/or playing the push content delivered from the multiple servers. Operation of the mobile content application 308 will be described in more detail below, in connection with FIGS. 5, 6, and 7.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
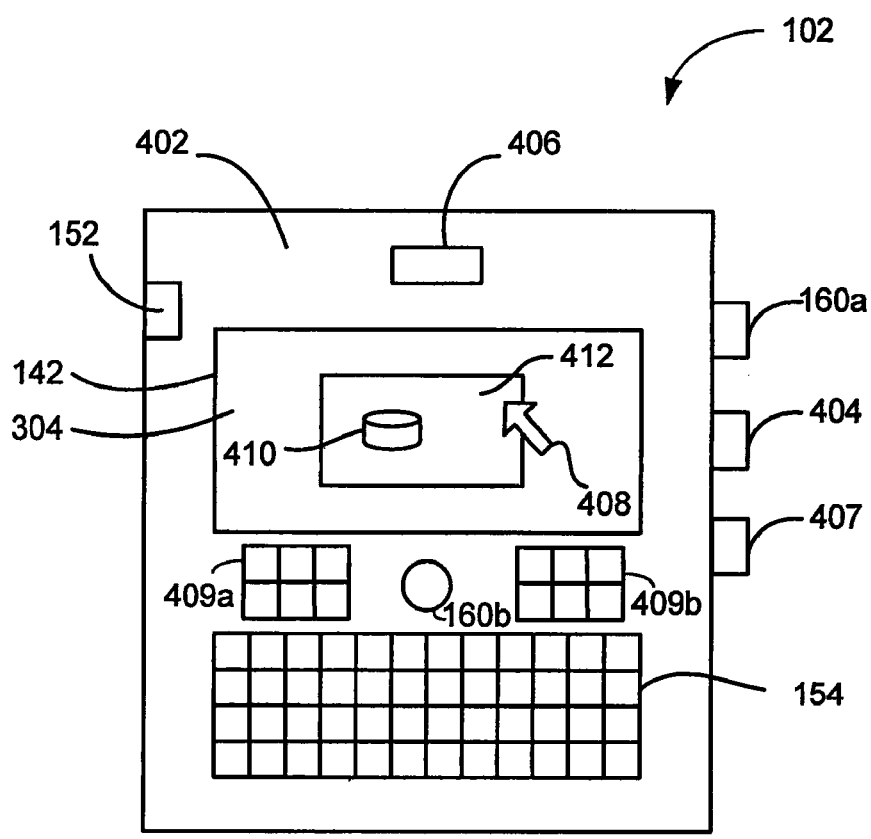
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160a, the trackball 160b) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

In the present disclosure, the term "push" may be used to refer to a method of content delivery to a wireless device that may be automatically delivered by a content server without any action being required on the part of the wireless device or the user of the wireless device. In the present disclosure, the term "pull" may be used to refer to a method of content delivery to a wireless or mobile device that is initiated by the mobile device requesting the content from a content server with or without any action being required on the part of the mobile device user. A wireless device may also be referred to in the present disclosure as a mobile device. The term "mobile device" may refer to a mobile wireless communication device that communicates over a communication network, including cellular telephones, mobile phones, smartphones, wireless laptop computers, personal digital assistants (PDAs), pages, and other similar devices. In the present disclosure, the term "content" may be used to refer to one or more digital media types that, when combined, create a document or a content package. This package may include text, images, video, audio, and other media types.

In some aspects, the present disclosure provides a method for authoring mobile content for delivery to a mobile device. This may address some of the challenges with current systems because it may allow an author to create and automatically deliver authored content, such as Word content from Word, through a Mobile Content Development System (MCDS) to a selected user's mobile device. This method and system may not require any end-user intervention to deliver the content. The content may be automatically pushed directly to the end-user's mobile device and may be rendered using the mobile content application.

In some aspects, the present disclosure may provide the functionality to incorporate images, audio, and video in a format supported by a mobile device. The disclosed method and system may also convert embedded audio or video content into a format that is usable by the mobile device. If a graphic is too large for the viewing area of the mobile device then the graphic may be accessible via a thumbnail link within the content.

The disclosed method and system may also provide the functionality to track when the content was accessed and an assessment can also be attached at the end of the document. This assessment can be used to gather feedback or to assess the users understanding of the provided content. This method and system may add security to the distribution of mobile content, such as Word documents, as a user cannot redistribute the content that has been pushed to their mobile device in this manner. The method and system may be implemented using any suitable mobile platform, and is not limited to any platform discussed herein.

In some aspects, the present disclosure may be provided as an add-in application integrated within a content authoring application, such as the Microsoft Word application. When it is installed, a separate menu item may appear in the Word menu that provides the user with options for authoring, publishing, and delivering the content. Using the disclosed subject matter, the user can open an existing content file or create a new content file and may insert the desired compatible media formats. The content and all inserted media may be packaged in the content authoring application, sent to the MCDS, for example in an open XML format, and may be converted to a format supported for a mobile device, and then delivered to the user's mobile device.

The present disclosure may provide an easy method for users to create, publish and deliver content. In some aspects, the user may be able to insert a prerecorded audio file, a video file, graphics, text, or other similar content. It may allow the user to set content tracking options, schedule immediate content delivery or enter a preferred content delivery date, and select users or groups with mobile devices for the delivery of the content. It may also allow the user to view reports to see the status of the assigned content as well as assessment results for the selected users or groups.

In general, the user, who may also be referred to as the author, may open an existing document or may create a new document in Microsoft Word. The user may add content to the document, such as a Word document, as desired. When the user has completed authoring the content, the user may select to publish the content from a publish feature within a menu. The user may then choose the desired publish and delivery options for the content. When the options are set, the user may publish and may deliver the content directly to the user's mobile device simply by pushing a button within the publish feature interface. When the publish and delivery feature is triggered within the add-in, the content may be packaged and the package may be sent to the MCDS where it may be further processed for compatibility to play on a mobile device. After the final packaging is complete, the content may be delivered to the user's mobile device.

Figure 5:
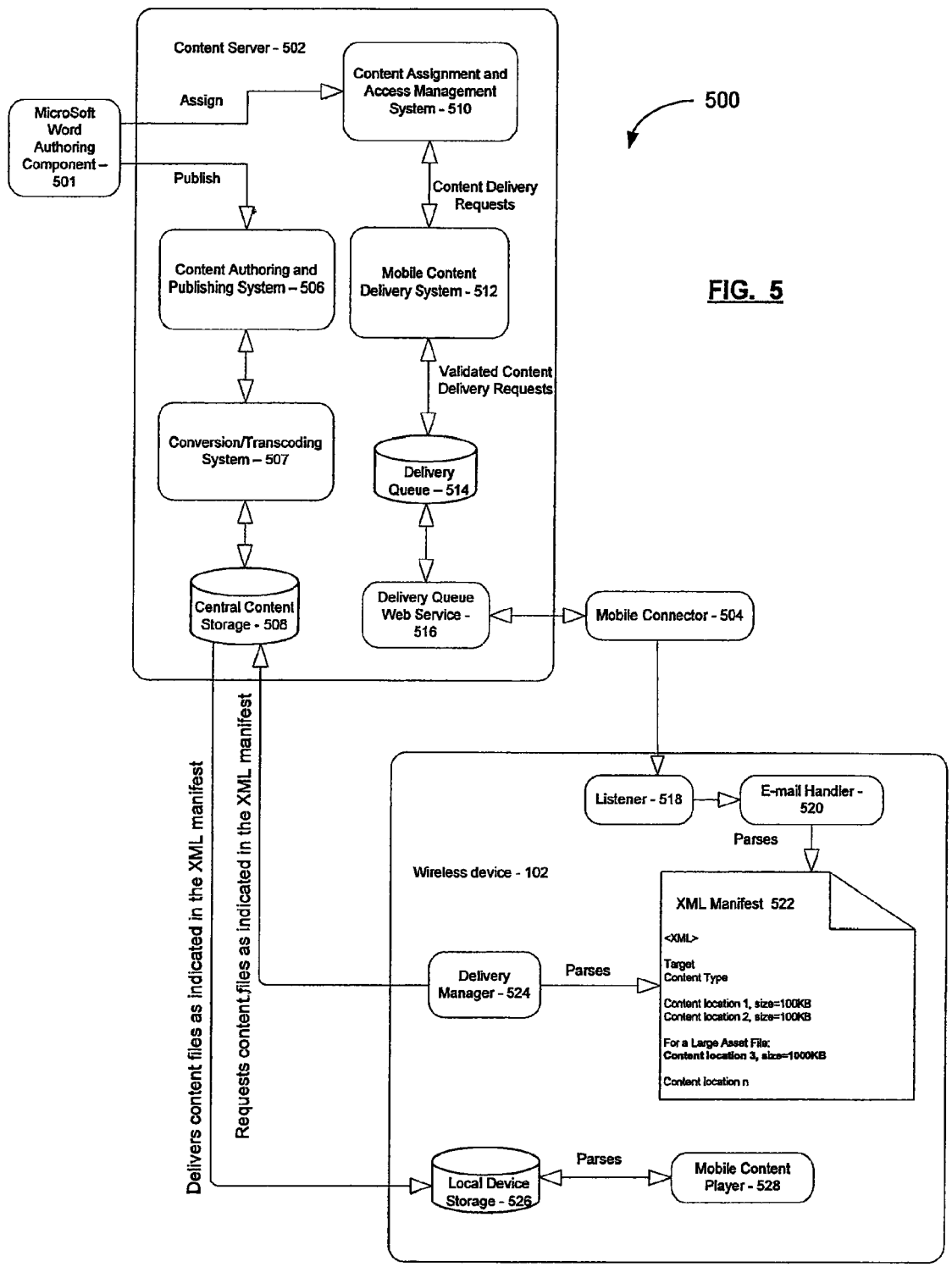
FIG. 5 shows in simplified block diagram form aspects of the communications system of FIG. 2 and the wireless device of FIG. 1 configured to for authoring mobile content for delivery to a wireless device, in accordance with one embodiment.

Reference is now made to FIG. 5, which is a simplified block diagram showing aspects of the wireless device 102 and the communication system 200 suitable for automatically republishing mobile content. The system shown in FIG. 5 is referred to collectively as the system 500.

The system 500 may generally include a content server 502, which may be implemented, for example, by the content server 226 shown in FIG. 2. The system may also include one or more wireless devices 102, only one of which is shown, which may also be referred to as a mobile device. The system 500 may also include a mobile connector 504, which may be implemented, for example, by the network provider system 220 of FIG. 2. The system may also include a content authoring component 501.

The content server 502 may generally include a content authoring and publishing system 506, a conversion/transcoding system 507, a central content storage 508, a content assignment and access management system 510, a mobile content delivery system 512, a delivery queue 514, and a delivery queue web service 516.

The content authoring component 501 may be any suitable content authoring application for creating content, such as the Microsoft Word application. The user may open an existing document or creates a new document using the content authoring component 501. The user may add content to the document as desired. When the user has completed authoring the content, the user may select to publish the content from a publish feature within a menu provided in the content authoring component 501. Web services provided by the content authoring and publishing system 506 may be used for authoring and/or publishing the content. The document may be exported, for example in an open XML format. The content authoring component 501 may be implemented, for example, as a software application resident in the user's wireless device 102 or in another computing device, such as the computer 222. Where the content authoring component 501 is resident on the user's wireless device 102, the wireless device 102 may both author and receive the content.

The content authoring component 501 may provide selectable delivery options and/or selectable publishing options. Delivery options may include a content tracking option, a scheduled content delivery time, and assignment of a recipient for the content delivery. The content tracking may allow the delivery and distribution of the content to be tracked. The scheduled content delivery time may allow a selection of immediate content delivery or a preferred content delivery time. The assignment of a recipient may allow selection of the recipient for the content delivery, and this assignment information may be provided to the content assignment and access management system 510. There may also be an option to create a status report for the content, which may provide information on the assigned recipients, the status of the content, and assessment results of the content. These options may be provided through web services from the content server 502.

When the user chooses the desired publish and/or delivery options for the content, the web services provided by the mobile content delivery system 512 may be used. The document may be published and exported accorded to the selected options. The document may be exported, for example in an open XML format.

The content authoring and publishing system 506 may be implemented using any of a number of suitable systems, either currently available or yet to be developed, which provide for content authoring and publishing. The content authoring and publishing system 506 may provide for the creation and central storage of content formatted for mobile devices. The authoring may be accomplished by an appropriate application and then saved to a central server, such as the central storage 508, for later access, such as by the wireless devices 102. For example, an audio clip may be authored in an audio editing tool, saved, and then published to a central content server or central storage 508. In one example, another system 506 may manage access to this content.

The conversion/transcoding system 507 may convert the format of the document, such as an open XML format, into a format that may be able to be rendered on the wireless device 102. This may be accomplished, for example, through a XSLT transformation from the open XML to CHTML that may then be rendered on the wireless device 102 using the wireless device's 102 CHTML rendering capabilities. Additional elements such as video and audio may be placed in the CHTML with special tags that the wireless device 102 understands how to render. This conversion may also manage the decision to embed images or to insert a link to the images, for example depending on the dimensions of the image. For example, the image may have dimensions that are too large to be displayed to its full dimensions when embedded in the content. The images may be split out into separate files references by the XML manifest 522. This conversion may also manage the presentation of tables in a similar manner, based on the dimensions of the table. Other similar conversions for other content elements may be performed by the conversion/transcoding system 507, according to techniques known to those skilled in the art or solutions yet to be developed.

Once the content has been created, the content may be assigned to users for consumption. This assignment may function as a trigger for the delivery to occur. The assignment may be performed by the content assignment and access management system 510.

The mobile content delivery system 512 may receive requests for delivering content. These requests may originate from a system component that is assigning the content to users, such as the content authoring and publishing system 506 and/or the content assignment and access management system 510. When these requests are received, the mobile content delivery system 512 may look up the target and determine if the user has a wireless device 102 and if that device has a transport defined. The request may be verified to be in the proper format and then processed. If the user does not have a wireless device 102 or a transport has not been defined, then the appropriate response, for example an error message, may be returned to the requesting system. Every user may register with the mobile content delivery system 512 to ensure the deliveries can take place. Once this information is gathered, the mobile content delivery system 512 may place the request onto the delivery queue 514 with a status indicator of "New". In one example, the request may be an XML request.

Each request, which may be an XML request, may be populated with a company identifier that determines which company is authorized to view the request on the delivery queue 514. Modifications to the content may occur after the content has been delivered. It may be left to the original sender of the request (e.g., a calling application) to send a new delivery request for the content if it has changed.

The delivery queue web service 516 may listen for requests made by the mobile connector 504. These may be requests to determine if there are items on the queue 514 that the mobile connector 504 is able to extract and deliver.

The mobile connector 504 may poll the delivery queue web service 516 in predefined intervals to see if there is any content available that needs to be delivered. The mobile connector 504 may be configured for a specific content server or publisher. The mobile connector 504 may issue a web services call to the delivery queue web service 516. This call may contain user credentials that the web service 516 authenticates to determine what queue items the mobile connector 504 is authorized to see. If there are no items authorized, the mobile connector 504 may wait for a predefined time interval to elapse and try again. If the mobile connector 504 does find an item on the deliver queue 514, the mobile connector 504 may retrieve the queued item, for example as an XML document describing the content, as has been described above. The mobile connector 504 may only process one queued item at a time, but may alternatively be configured to process multiple items at a time.

When the mobile connector 504 receives, for example, an XML transaction from the web service 516, the mobile connector 504 may look up the intended transport for the wireless device 102 type and may deliver the content to the wireless device 102. The mobile connector 504 may further return result codes back to the delivery queue web service 516 based on the ability of the mobile connector 504 to successfully send the delivery request to the wireless device 102 infrastructure.

The mobile connector 504 may work simultaneously with several mobile platforms or transport types. This may include any transport that allows a real-time delivery of content to the wireless device 102, or any mechanism that publishes the content directly to the wireless devices 102 wirelessly.

The wireless device 102 may generally include a listener 518, an email handler 520, a delivery manager 524, local storage 526, and a mobile content player 528. The listener 518, the email handler 520, the delivery manager 524 and the mobile content player 528 may be part of the mobile content application 308.

In some aspects, the present disclosure may make use of caching servers for content delivery to the wireless device 102. When a delivery occurs, the content may be retrieved from a local caching server instead of the centralized content server 502. The mobile content player 528 may be programmed to render various content types. The mobile content application 308 may accept the delivery of content from the mobile content delivery system 512 through the content server 502. The mobile content application 308 may trigger notifications when new content has been delivered to the wireless device 102. When the content package has been delivered, the mobile content application 308 may provide notification, such as a visual notification, and may report the delivery status back to the content server 502. The content server 502 may then send a notification, for example via email, to the wireless device 102. There may be configuration notification options on the mobile content delivery system 512.

In some embodiments, where the document contains other media, such as images, video files, audio files, or text, the mobile content player 528 may render the document with the media either embedded in the document or as links, e.g., thumbnail links in the case of images, to media having larger dimensions depending on the initial dimensions and/or size of the media. The dimension limit for determining whether or not to provide media embedded in the document may be pre-determined by the conversion/transcoding system 507.

In some embodiments, the mobile content player 528 may render a document with a table in it, for example if the table has few enough columns such that its dimensions may be fully displayed on the wireless device 102, otherwise a link to the table may be provided. This may be pre-determined by the conversion/transcoding system 507. The table may be presented in a structured data format so that the user may navigate from cell to cell.

The delivery manager 524 may process a manifest file by retrieving each item specified by URL in the manifest file from the central content storage 508. These items may be placed in the local device storage 526 of the wireless device 102. Once content is delivered to the wireless device 102, the content may remain in persistent storage, e.g., in the local storage 526, for the mobile content player 528 to render it. The delivered content may be removed from either the mobile content application 308 or from the mobile content delivery system 512. If the mobile content player 528 attempts to render content that has been removed from the local storage 526, then the mobile content application 308 may attempt to retrieve the content from the content server 502. This attempt may be carried out automatically.

The listener 518 may listen for the request sent from the mobile connector 504. The listener 518 may receive content information, e.g., the XML manifest 522, and may extract each content URL from the XML manifest 522. The listener 518 may then send that URL to the delivery manager 524 for content retrieval using the content URLs.

If a request is received via e-mail, the wireless device 102 processes the e-mail through the email handler 520. The email handler 520 may decrypt the contents of the email, if encrypted, that contains the instructions for retrieving the content manifest, may read the e-mail information into memory, and then may delete the e-mail from the email inbox of the wireless device 102. The email handler 520 may use the information stored in memory to make a request, such as an HTTP request, to the content authoring and publishing system 506 requesting the content manifest. When the content authoring and publishing system 506 determines that a user's e-mail and PIN are valid, the system 506 may send the manifest to the mobile device 102, for example through a HTTP response.

Figure 6:
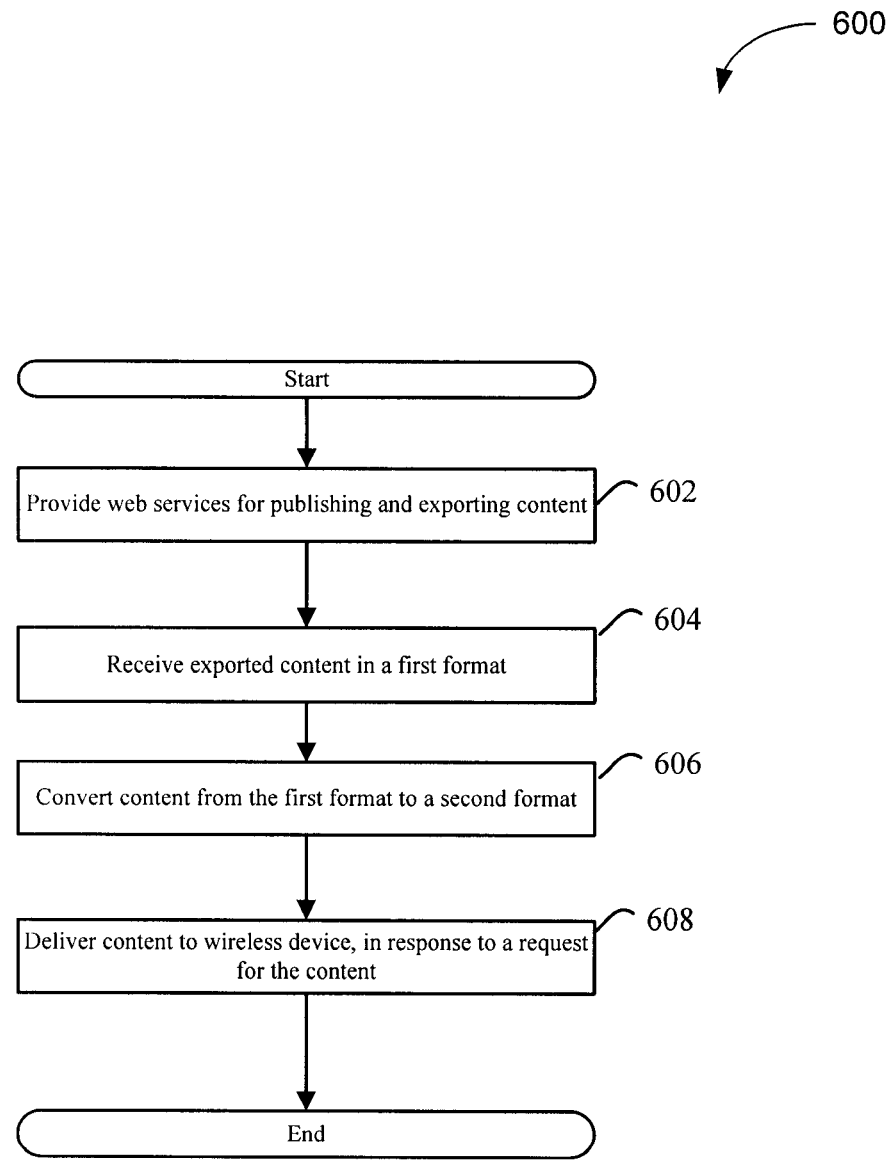
FIG. 6 is a flowchart illustrating a general method of delivering mobile content in a content delivery system, in accordance with one embodiment.

Reference is now made to FIG. 6, which is a flowchart illustrating a general method 600 of delivering mobile content to the wireless device 102 in a content delivery system, such as system 500. In general, the method 600 may be carried out at the content server 502.

At 602, web services, such as those provided by the content server 502 described above, are provided for publishing the content and exporting the content to the content server 502. These web services may be provided through the content authoring component 501, for example as an add-in, as described above.

At 604, exported content is received at the content server 502. The exported content may be exported in accordance with selected delivery and/or publishing options as described above. The exported content may be received in a first format, such as open XML format.

At 606, the content is converted from the first format to a second format compatible with or renderable by the wireless device. This may be performed by the conversion/transcoding system 507, as described above. The conversion may be from open XML format to CHTML format, as discussed above.

At 608, in response to a request for the content, the content is delivered to the wireless device. The request and delivery may be handled by the mobile content delivery system 512, the delivery queue 514, and the delivery queue web service 516, as described above.

Figure 7:
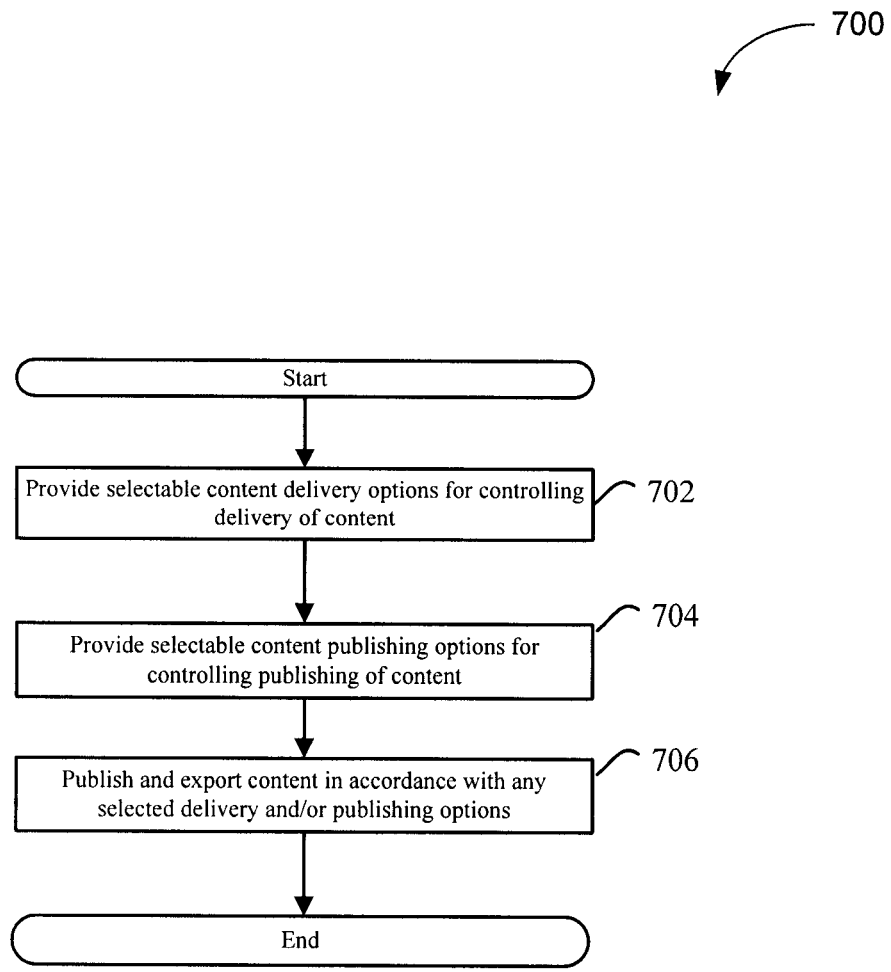
FIG. 7 is a flowchart illustrating a general method of authoring mobile content in a content delivery system, in accordance with one embodiment.

Reference is now made to FIG. 7, which is a flowchart illustrating a general method 700 of authoring content for the wireless device 102 in a content delivery system, such as system 500. In general, the method 700 may be carried out using the content authoring component 501, and may be carried out prior to the method 600.

At 702, selectable content delivery options are provided for controlling the delivery of content. These options may be provided through the content authoring component 501 and may use web services from the content server 502, as described above.

At 704, selectable content publishing options are provided for controlling the publishing of content. These options may be provided through the content authoring component 501 and may use web services from the content server 502, as described above.

At 706, the content is published and exported using web services, in accordance with any selected delivery and/or publishing options. This may be in response to an instruction to publish the content. The publishing and exporting may be performed using web services from the content delivery system, such as those provided by the content server 502. The content may be exported to the content server 502.

While the content servers 502 and mobile connectors 504 are represented as distinct components and have a number of sub-components, any of these components or subcomponents may be implemented as modules running on a number of interconnected servers or on a single server, depending on the design criteria of a particular application. For example, any of the components 502, 504, 506, 508, 510, 512, 514, and 516 may be implemented on any of the network provider system 212, the network 224, the content server 226, the email server 232, or the origin server 230. Alternatively, in one example, the components 502, 504, 506, 508, 510, 512, 514, and 516 may be implemented on a single one of the network provider system 212, the network 224, the content server 226, the email server 232, or the origin server 230. Additionally, a single content server 502 and a single mobile connector 504 are shown as an example in FIG. 5, the present description is intended to include any number of content servers (e.g., two or more) with mobile connectors operating to provide push content to the wireless devices 102.

While the steps of the method 600 and the method 700 are shown as occurring in a particular order, it will be appreciated by those skilled in the art that many of the steps are interchangeable and may occur in different orders than that shown without materially affecting the end results of the method 600 or the method 700. Although the method 600 and the method 700 are described separately, the method 600 and the method 700 may be carried out together as a single method. Although the method 700 may be carried out prior to the method 600, the methods may be carried out independent of each other, and one need not occur immediately before or immediately after another.

The subject matter described above may be used to author and deliver content to mobile devices. Possible applications of the disclosure include: (a) mobile training systems where courses are delivered to wireless device users and groups; for training systems, the content publishers may be from a compliance content provider, internal company training material, external content publisher, etc.; (b) corporate communications from content publishers which may include graphics, audio or video within the communications; (c) sales representatives may show prospective clients the benefits of their product with their product delivered in a Word content package formatted for display on the client's mobile device; (d) financial research documents that may be sent to a brokerage company's clients; and (e) the user may view the content while going in and out of network coverage areas because the content is local to the mobile device.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A content delivery system for delivering content to a wireless device, the system comprising:
  a content server configurable to deliver content to the wireless device, the content server having a processor connected to a memory;
  the content server having one or more modules stored in the memory and being configured to cause the content server to:
    provide web services to an add-in component integrated within a content authoring component of another computing device to enable the computing device to publish the content and export the content to the content server, the content authoring component suitable for creating content at the computing device, the add-in component providing for selection of at least one delivery option and at least one publishing option;
    upon a triggering of a publish and delivery feature of the add-in component, receive the exported content in a content package, at least one selected delivery option, and at least one selected publishing option from the add-in component, the content being in a first format;
    convert the content from the first format to a second format compatible with the wireless device, the converting comprising determining the second format based at least partly on a determination whether the wireless device is capable of rendering the content to at least one full dimension of the content; and
    in accordance with one of the at least one selected delivery option to push the content to the wireless device, deliver the content to the wireless device at least partly by pushing the content to the wireless device without requiring receipt of a request for the content.

2. The content delivery system of claim 1, wherein the one or more modules of the content server comprise:
  a content authoring and publishing system providing web services for creating content to be delivered to the wireless device;
  a conversion/transcoding system for converting content from the first format to the second format;
  a central storage device for storing content to be delivered to the wireless device;
  a content assignment and access management component for assigning content to be delivered to a particular wireless device;
  a mobile content delivery component coupled to the content assignment and access management component for handling delivery of the content to the wireless device;
  a delivery queue coupled to the mobile content delivery component for holding requests for delivery; and
  a delivery queue web service coupled to the delivery queue for retrieving queued items.

3. The content delivery system of claim 1, wherein the content includes media selected from at least one of: an image, an audio file, a video file, a text, and a table.

4. The content delivery system of claim 3, wherein converting the content comprises separating the media from the content and providing a link in the content to access the media, where the media is determined to exceed a predetermined dimension limit.

5. The content delivery system of claim 1, wherein the at least one selected delivery option is selected from at least one of: a content tracking option, a scheduled content delivery time, and assignment of a recipient for the content delivery.

6. The content delivery system of claim 1, wherein the one or more modules are further configured to cause the content server to:
  create a status report associated with the content, the status report providing a record of at least one of: recipients of the content, status of the content, and assessment results of the content.

7. A non-transitory computer-readable medium for authoring content for a wireless device in a content delivery system, comprising a computer program product having computer executable instructions tangibly recorded thereon, the computer program product being configured to cause another computing device to:

provide selectable content delivery options in an add-in component integrated within a content authoring component of the computing device, the delivery options for controlling the delivery of the content, the content authoring component suitable for creating content at the computing device;

provide selectable content publishing options in the add-in component for controlling the publishing of the content; and in response to an instruction to publish content from the add-in component, publish and export the content using web services, the web services provided by a content server of the content delivery system to the add-in component, the content being exported in a first format from the add-in component to the content server in a content package upon a triggering of a publish and delivery feature of the add-in component, the instruction comprising at least one selected delivery option and at least one selected publishing option, the content being converted by the content server to a second format compatible with the wireless device, the converting comprising determining the second format based at least partly on a determination whether the wireless device is capable of rendering the content to at least one full dimension of the content, the content being delivered by the content server to the wireless device at least partly by being pushed to the wireless device without requiring receipt of a request for the content in accordance with at least one of a selected content delivery option and a selected content publishing option, the at least one of the selected content delivery option to push the content to the wireless device.

8. The non-transitory computer-readable medium of claim 7 wherein the at least one of the selected content delivery option comprises at least one of: a content tracking option, a scheduled content delivery time, assignment of a recipient for the content delivery.

9. The non-transitory computer-readable medium of claim 7 wherein the computer program product is configured to be executed with a content authoring component, and the computer program product provides additional mobile content authoring and delivery functions for the content authoring component.

10. A method for delivering content to a wireless device in a content delivery system having a content server configurable for delivering content to the wireless device, the method being carried out by the content server and comprising:

providing web services to an add-in component integrated within a content authoring component of another computing device to enable the computing device to publish the content and export the content to the content server, the content authoring component suitable for creating content at the computing device, the add-in component providing for selection of at least one delivery option and at least one publishing option;

upon a triggering of a publish and delivery feature of the add-in component, receiving exported content in a content package, at least one selected delivery option, and at least one publishing option at the content server from the add-in component, the content being in a first format;

converting the content from the first format to a second format compatible with the wireless device, the converting comprising determining the second format based at least partly on a determination whether the wireless device is capable of rendering the content to at least one full dimension of the content; and in accordance with one of the at least one selected delivery option to push the content to the wireless device, delivering the content to the wireless device, at least partly by pushing the content to the wireless device without requiring receipt of a request for the content.

11. The method of claim 10, wherein the content includes media selected from at least one of:

an image, an audio file, a video file, and a text.

12. The method of claim 10, wherein converting the content comprises separating the media from the content and providing a link in the content to access the media, where the media is determined to exceed a preset dimension limit.

13. The method of claim 10, wherein the at least one selected delivery option is selected from at least one of:

a content tracking option, a scheduled content delivery time, and assignment of a recipient for the content delivery.

14. The content delivery system of claim 1, further comprising a mobile connector coupled to the content server to enable delivery of the content to the wireless device.

15. The content delivery system of claim 1, wherein the content authoring component comprises a word processor application, and the add-in component comprises an add-in application integrated within the word processor application.

16. The non-transitory computer-readable medium of claim 7, wherein the content authoring component comprises a word processor application, and the add-in component comprises an add-in application integrated within the word processor application.

17. The method of claim 10, wherein the content authoring component comprises a word processor application, and the add-in component comprises an add-in application integrated within the word processor application.

18. The content delivery system of claim 1, wherein the content comprises at least one image comprising dimensions too large to be displayed by the wireless device when embedded in the content, and the converting comprises splitting the at least one image into separate image file references in the second format.

19. The non-transitory computer-readable medium of claim 7, wherein the content comprises at least one image comprising dimensions too large to be displayed by the wireless device when embedded in the content, and the converting comprises splitting the at least one image into separate image file references in the second format.

20. The method of claim 10, wherein the content comprises at least one image comprising dimensions too large to be displayed by the wireless device when embedded in the content, and the converting comprises splitting the at least one image into separate image file references in the second format.

* * * * *